United States Patent [19]

Saiki et al.

[11] Patent Number: 4,832,929
[45] Date of Patent: May 23, 1989

[54] PROCESS FOR PRODUCING A SILICON CARBIDE POWDER

[75] Inventors: Goro Saiki; Jiro Kondo, both of Kawasaki, Japan

[73] Assignee: Nippon Steel Corporation, Tokyo, Japan

[21] Appl. No.: 6,688

[22] Filed: Jan. 23, 1987

Related U.S. Application Data

[62] Division of Ser. No. 847,940, Apr. 3, 1986, abandoned.

[30] Foreign Application Priority Data

| Apr. 4, 1985 | [JP] | Japan | 60-70101 |
| Jul. 8, 1985 | [JP] | Japan | 60-148400 |
| Aug. 22, 1985 | [JP] | Japan | 60-183098 |

[51] Int. Cl.⁴ .................................. C01B 33/00
[52] U.S. Cl. ......................... 423/346; 423/345
[58] Field of Search ................. 423/345, 346, 347

[56] References Cited

U.S. PATENT DOCUMENTS

| 3,175,884 | 3/1965 | Kuhn | 23/208 |
| 3,340,020 | 9/1967 | Neuenschwander et al. | 23/349 |
| 3,758,672 | 9/1973 | Lewis | 423/345 |
| 3,839,542 | 10/1974 | Chase | 423/346 |
| 3,979,500 | 9/1976 | Sheppard et al. | 423/289 |
| 4,004,934 | 1/1977 | Prochazka | 106/44 |
| 4,133,689 | 1/1979 | Stroke | 106/44 |
| 4,327,066 | 4/1982 | Seimiya | 423/345 |
| 4,456,634 | 6/1984 | Galasso et al. | 427/228 |
| 4,571,331 | 2/1986 | Endou et al. | 423/345 |

FOREIGN PATENT DOCUMENTS 51-37898  9/1974  Japan .

OTHER PUBLICATIONS

Japanese Journal of Applied Physics, vol. 19, No. 11, pp. L693–694, Nov. 1980, "Preparation of Ultrafine Powder by Modified Gas-Evaporation".

*Primary Examiner*—John F. Terapane
*Assistant Examiner*—Eric Jorgensen

[57] ABSTRACT

Silicon carbide particles are produced by reacting a gaseous silicon compound or granular silicon with a carbon compound at a high temperature. In the reaction, the amount of free carbon content in the resultant silicon carbide particles can be controlled by monitoring the amount of unsaturated hydrocarbon such as acetylene, as a by-product. Moreover, silicon carbide particles can contain boron dispersed uniformly in the particles by a two step process comprising first reacting a silicon source and a boron source without a carbon source in a first reaction zone, to form boron-containing silicon particles, and second, reacting the resultant particles with a carbon source in a second reaction zone. Further, the above-mentioned monitoring of an unsaturated hydrocarbon by-product allows the obtaining of silicon carbide particles containing no free carbon, and the silicon carbide particles containing boron in the particles but no free carbon may be sintered without the addition of free carbon, to give a dense sinter.

4 Claims, 2 Drawing Sheets

PROCESS FOR PRODUCING A SILICON CARBIDE POWDER

This is a division of application Ser. No. 847,940 filed Apr. 3, 1986 (now abandoned).

BACKGROUND OF THE INVENTION

1. Field of the Invention

The present invention relates to a process for producing silicone carbide particles suitable for making a dense silicon carbide sinter. More specifically, it relates to a process for producing silicon carbide particles in which a free carbon content in the silicon carbide particles is controlled by monitoring a by-product such as acetylene. The present invention also relates to a process for producing a silicon carbide sinter from silicon carbide particles obtained by the above process.

2. Description of the Related Art

Silicon carbide has attracted attention as an excellent high temperature strength material suitable for use in gas turbines, etc. It is however difficult to sinter a silicon carbide body to a density close to the theoretical density of 3.21 g/cm$^3$. Processes for obtaining a dense silicon carbide sinter have been proposed, for example, U.S. patent application Ser. No. 409073 filed on Oct. 24, 1973, in which a boron-containing compound in an amount corresponding to 0.1 to 3.0 wt % of boron and a carbon source corresponding to 0.1 to 1.0 wt % of elemental carbon as densifying agents are dispersed uniformly with submicron β-type silicon carbide particles, the resultant uniform dispersion is formed into a shape, and the shape is fired to obtain a dense silicon carbide sinter. To produce submicron β-type silicon carbide particles, a gaseous trichloromethylsilane and hydrogen, or a suitable gaseous hydrocarbon such as silicon trichloride or toluene and hydrogen, are introduced into an argon plasma generated between two concentric electrodes to produce silicon carbide crystallites having a size of 0.1 to 0.3 μm. It is also disclosed that free carbon may be contained in silicon carbide particles by using the carbon source in an amount slightly larger than the stoichiometric amount necessary for producing silicon carbide.

It is known that, to obtain an excellent silicon carbide sinter, silicon carbide particles containing boron and free carbon, desirably uniformly dispersed in the particles, as densifying agents, are preferable to a mixture of silicon carbide particles and densifying agents such as a boron source and a carbon source. The former allows a uniform structure of a sinter and an improvement of the mechanical properties of a sinter. Thus, the above U.S. patent application Ser. No. 409,073 discloses that free carbon may be contained in silicon carbide particles in a process for synthesizing the silicon carbide particles.

The amount of densifying agent is critical to the characteristics of a sinter. If the amount of densifying agent is not appropriate, a good quality sinter cannot be obtained. Therefore, when the free carbon produced in silicon carbide particles during the synthesis of silicon carbide particles is used as a densifying agent, control of the amount of the free carbon produced in the silicon carbide particles is very important.

It is, however, impossible to concurrently determine a quantitative amount of free carbon produced during the synthesis of silicon carbide particles. Thus, the amount of free carbon in silicon carbide particles is analyzed after a certain amount of silicon carbide particles have been synthesized to determine whether or not the amount of free carbon produced during the synthesis is appropriate. Further, to control the amount of free carbon produced in silicon carbide particles in accordance with the results of the above analysis, it is necessary to preliminarily examine the relationships between the reaction conditions and the amount of free carbon, by synthesizing silicon carbide particles under various reaction conditions. This necessitates a large number of experiments. Here, the reaction conditions include temperature, pressure, feed of raw materials, shape of a reaction chamber, etc.

Even if the reaction is conducted in specified conditions, the amount of free carbon in the silicon carbide particles may vary with the amount of time lapsed, because silicon carbide particles, etc., are deposited on the inside wall of a reaction chamber and, as a result, the residence time of a raw material in the reaction chamber and other factors are varied. This makes it difficult to produce free carbon in a desired amount.

U.S. patent application Ser. No. 471,303 filed on May 20, 1974 discloses a process for producing particles comprising a uniform dispersion of β-type silicon carbide, boron and free carbon, in which a gaseous mixture essentially consisting of a silicon halide, a boron halide, and a hydrocarbon is introduced to a plasma jet reaction zone. This application suggests the effectiveness of a concurrent addition of boron halide during the synthesis of silicon carbide particles.

If a silicon compound, a carbon compound, and a boron compound are concurrently introduced into a single high temperature reaction zone, as in the U.S. Patent Application Ser. No. 471,303, mainly, silicon carbide is grown onto silicon carbide seeds, to give submicron silicon carbide crystals, and boron carbide or boron is grown onto boron carbide or boron seeds to give submicron boron carbide or boron crystals, respectively. Almost all of the boron is not doped in silicon carbide particles. In other words, high temperature stable extremely small seed crystals of silicon carbide, boron carbide and boron are first produced respectively, and then silicon carbide, boron carbide and boron are grown around these seed crystals, respectively, maintaining the same crystal structure, resulting in the formation of submicron silicon carbide, boron carbide and boron particles, respectively. In such a case, boron is not always contained in silicon carbide particles but tends to form boron carbide particles or boron particles, although a silicon compound, a carbon compound and a boron compound are added in a single reaction zone. Thus, almost all of the boron is not dispersed uniformly in the silicon carbide particles and it is difficult to obtain silicon carbide particles with boron uniformly dispersed therein.

SUMMARY OF THE INVENTION

An object of the present invention is to provide a process for obtaining uniform silicon carbide particles containing a desired amount of free carbon by monitoring the amount of produced free carbon in silicon carbide particles indirectly but in real time during the synthesis thereof and controlling the amount of free carbon accordingly.

Another object of the present invention is to provide a process for producing silicon carbide particles containing boron which corresponds to almost all of a boron source fed and is dispersed uniformly in the particles.

A further object of the present invention is to provide a process for producing a silicon carbide sinter, which process produces a dense sinter having uniform and improved characteristics.

A still further object of the present invention is to provide a process for producing a silicon carbide sinter, which process is simple and provides a sinter having improved characteristics.

The above and other objects of the present invention are attained by a process for producing silicon carbide particles from a reaction between a gaseous silicon compound or particulate silicon and a gaseous carbon compound at a high temperature, in which an amount of an unsaturated hydrocarbon produced as a by-product during the reaction is monitored and the conditions of the reaction are controlled in accordance with the monitored amount of the unsaturated hydrocarbon by-product, to regulate the amount of the unsaturated hydrocarbon by-product to a certain range, whereby the content of free carbon in the silicon carbide particles is controlled.

If an amount of a carbon compound slightly in excess of the stoichiometric amount is used in the synthesis of silicon carbide particles from the silicon compound and the carbon compound, the carbon compound in an amount of the stoichiometric amount is reacted with the silicon compound, and the silicon carbide is produced. On the other hand, a portion of the carbon compound in excess of the stoichiometric amount produces free carbon and the rest of the carbon compound is emitted from the reaction system as a gas.

A gas emitted from the reaction system includes the carbon compound of the starting material and another carbon compound resulted from the starting carbon compound, for example, an unsaturated hydrocarbon such as acetylene.

The present inventors found that there is a strong relationship between the amount of unsaturated hydrocarbon as a by-product and the amount of free carbon as a product. If the amount of an unsaturated hydrocarbon by-product is larger, the amount of free carbon product is also larger. The relationship between these appears repeatedly.

By an equipment capable of analyzing a gas in an extremely short time period, such as a mass spectrograph or a gas chromatograph, the amount of an unsaturated hydrocarbon by-product can be measured in real time, which allows the detection of the amount of the free carbon product in real time. As the amount of the free carbon product can be detected during the synthesis of silicon carbide in real time, it is possible to control the amount of the free carbon product to an appropriate value or range at all times. That is, once the relationship between the amount of an unsaturated hydrocarbon by-product and the free carbon product is determined by experiments, controlling the reaction to make the amount of the unsaturated hydrocarbon by-product to a certain value results in producing a certain desired amount of free carbon. In order to control the reaction, the feeding rate of a carbon compound of the starting material is ordinarily varied, but the variation of other factors such as temperature and pressure also may be used.

Regarding the reasons why such a strong relationship is present beteween the amount of free carbon product and the amount of an unsaturated hydrocarbon by-product, we considered the following: That is, because the reaction conditions of producing, an unsaturated hydrocarbon from a carbon compound of the starting material have strong similarities to those of producing the free carbon, or because an unsaturated hydrocarbon is an intermediate reaction product of a free carbon producing reaction. The mechanism of the production of free carbon, however, has not been made clear at present.

In a process according to the present invention, silicon carbide particles containing substantially no free carbon can be produced.

In an embodiment of this process, the particulate silicon mentioned-above may be prepared by introducing a silicon compound to a first reaction zone at a temperature higher than a melting point of silicon to form fused spherical silicon particles. The resultant fused spherical silicon particles are then reacted with a carbon compound in a second reaction zone at a temperature of less than a boiling point of silicon to produce silicon carbide particles. This two step process allows the production of desirably spherical silicon carbide particles.

In the above two step process, silicon carbide particles containing a small amount of boron uniformly distributed in the particles can be produced. Such boron-containing silicon carbide particles can be prepared by introducing silicon or a silicon compound containing no carbon together with boron or a boron compound containing no carbon into a first reaction zone at a temperature higher than the melting point of silicon to form fused boron-containing silicon particles. The resultant fused boron-containing silicon particles are then reacted with the carbon compound in a second reaction zone at a temperature of less than the boiling point of silicon to produce silicon carbide particles containing a small amount of boron.

Preferably, the silicon or silicon compound and the boron or boron compound are preliminarily mixed together before being introduced to the first reaction zone.

The silicon carbide particles preferably contain boron, as a densifying agent for sintering silicon carbide particles, in a range of from 0.1 to 5.0% by weight.

Thus obtained boron-containing silicon carbide particles can be sintered without the addition of any carbon source even if the silicon carbide particles do not contain free carbon, as explained later in detail. Boron-containing silicon carbide particles containing substantially no free carbon can be produced in a process described before, i.e., in a two step process, by monitoring an unsaturated hydrocarbon by-product.

Thus, according to the present invention, there is provided a process for producing a silicon carbide sinter, comprising the steps of preparing silicon carbide particles containing 5% or less by weight of boron and substantially no free carbon, forming a shape of the boron-containing silicon carbide particles without the addition of a carbon source, and firing the shape.

DESCRIPTION OF THE PREFERRED EMBODIMENTS

Figure 1:
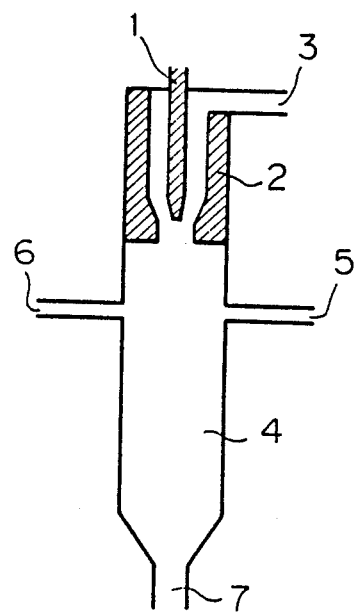
FIG. 1 is a sectional side view of an apparatus for producing silicon carbide particles in a reaction zone according to the present invention.

The strong relationship between the amount of free carbon product and the amount of an unsaturated hydrocarbon by-product appears in a reaction of a gaseous silicon compound or particulate silicon with a gaseous carbon compound to produce silicon carbide particles at a high temperature. The silicon compound used includes, for example, silane $SiH_4$, monochlorosilane $SiH_3Cl$, dichlorosilane $SiH_2Cl_2$, trichlorosilane $SiHCl_3$, silicon tetrachloride $SiCl_4$ and disilane $Si_2H_6$. Silane is preferred.

Fine particulate silicon may be used in place of a gaseous silicon compound. Particulate silicon having an average particle size of 100 to 0.1 $\mu$m is preferred.

The carbon compound used includes, for example, an aliphatic hydrocarbon such as methane, ethane, propane, butane, ethylene, propylene and buthylene, an cyclic hydrocarbon such as benzene, toluene and cyclohexane.

The unsaturated hydrocarbon used for monitoring includes, for example, acetylene. We found that an aliphatic hydrocarbon having 4 or less carbon atoms gives an especially strong relationship between the amount of free carbon product and the amount of acetylene by-product, and such an aliphatic hydrocarbon is preferably used.

The unsaturated hydrocarbon used for monitoring may be a combination of two or more unsaturated hydrocarbon or even a combination of one or more unsaturated hydrocarbon and one or more other unsaturated hydrocarbon, etc. Further, the unsaturated hydrocarbon when the starting carbon compound is a substituted hydrocarbon.

In a preferred embodiment of the present invention, silicon carbide particles are produced by two steps. That is, a silicon compound is introduced into a first reaction zone at a temperature higher than the melting point of silicon, 1685K, to form fused spherical silicon particles, and then the resultant fused spherical silicon particles are reacted with a carbon compound in a second reaction zone at a temperature below the boiling point of silicon, 3492K, to form silicon carbide particles. This two step process gives uniform spherical silicon carbide particles suitable for obtaining a uniform and improved silicon carbide sinter (see Japanese Kokai Publication No. 60-77114).

The present invention can be applied even if the particulate silicon as the starting material contains a small amount of an additive. For example, the present invention can be applied where the silicon particles contain a small amount of boron. In such a case, silicon carbide particles can be produced by introducing silicon or a silicon compound containing no carbon and boron or a boron compound containing no carbon into a first reaction zone at a temperature higher than the melting point of silicon, 1685K, to produce fused boron-containing silicon carbide particles, and the resultant fused boron-containing silicon carbide particles are then reacted with a carbon compound at a temperature below the boiling point of silicon, 2608K, to produce silicon carbide particles containing a small amount of boron.

In such a case, the mechanism of a reaction of silicon particles containing boron with a carbon compound to produce silicon carbide particles containing boron is the same or almost the same as the mechanism of a reaction of silicon particles with a carbon compound to produce silicon carbide particles containing no boron. As a result, the present invention can be applied to both the former and the latter reactions. First, a relationship between the amount of free carbon product and the amount of an unsaturated hydrocarbon by-product in the considered reaction is preliminarily examined. This can be done by a considerably smaller number of experiments than the number of experiments needed to examine the amount of free carbon product under various reaction conditions. Next, during the synthesis, the reaction is controlled to make the amount of the unsaturated hydrocarbon by-product correspond to a desired free carbon product. If the amount of the unsaturated hydrocarbon by-product is smaller than a certain value, the feeding rate of the carbon product is increased. If the amount of the unsaturated hydrocarbon is larger than the certain value, the feeding rate of the carbon compound is decreased. Thus, silicon carbide particles containing a desired amount of free carbon and uniformly dispersed boron can be produced over a long period of time.

In the above synthesis, the silicon or a silicon compound used may be the same as used in the synthesis of silicon carbide particles containing no boron.

The boron compound used may be any one that deposits boron in the first reaction zone and includes, for example, diborane $B_2H_6$, tetraboron $B_4H_{10}$ and boron trichloride $BCl_3$. A boron compound that relatively easily deposits boron at a high temperature, such as diborane, is preferred. Fine boron particles may be used in place of a boron compound.

The ratio of boron to silicon may be selected according to the applications of the resultant silicon carbide particles. To obtain a good silicon carbide sinter, the amount of boron may be 5% or less by weight, preferably 4% or less by weight, based on the amount of silicon.

The silicon or silicon compound and the boron or boron compound are preferably introduced to the same portion of the first reaction zone. More preferably, they are preliminarily mixed in a given ratio before being introduced to the first reaction zone. This allows a more thorough mix of the silicon or silicon compound with the boron or boron compound and allows a stable introduction of the boron or boron compound in a well defined ratio to the silicon or silicon compound in the first reaction zone, due to the preliminary mixing. This is also preferred since, if silane and diborane are used, poisoneous diborane will be burnt by ignition of the silane if a leak occurs.

The silicon compound and the boron compound thus introduced to the first reaction zone are quickly decomposed and form silicon and boron. The silicon is just melted and forms fused silicon particles since the temperature in the first reaction zone is above the melting point of silicon. Almost all the boron is ingested in the fused silicon particles, since fused silicon has a tendency to ingest boron, and fused silicon particles containing uniformly dispersed boron are obtained. The temperature in the first reaction zone is preferably below the boiling point of the silicon, in order to form silicon particles.

The fused silicon particles containing boron are then reacted with a carbon compound in a second reaction zone to form silicon carbide particles containing uniformly dispersed boron. The second reaction zone preferably has a temperature at which the fused silicon particles are liquid. The carbon compound used may be the same as that used in the synthesis of silicon carbide particles, i.e., containing no boron. The carbon compound should not flow back into the first reaction zone since, if the carbon compound flows back into the first reaction zone, the carbon compound will come into contact with the silicon compound and the boron compound and, as a result, boron carbide particles and boron particles are easily produced in addition to silicon carbide particles, as described in relation to the related art. In the present invention, however, almost all of the boron is uniformly dispersed in the silicon carbide particles, since boron and fused silicon, easily ingests boron, are formed together in the first reaction zone, wherein fused silicon particles containing extremely uniformly dispersed boron are produced and are then carbonized in the second reaction zone by the carbon compound to obtain silicon carbide particles.

The present invention enables the synthesizing of silicon carbide particles containing no free carbon. In this case, the corresponding amount of an unsaturated hydrocarbon by-product is considerably small.

Further, the present inventors found that a dense silicon carbide sinter can be produced from silicon carbide particles without the addition of a densifying agent such as free carbon, if the silicon carbide particles contain boron. Thus, the present invention provides a process for producing a silicon carbide sinter, comprising the steps of preparing silicon carbide particles containing 5% or less by weight of boron and substantially no free carbon by a process described before, forming a shape of the boron-containing silicon particles without the addition of a densifying agent such as free carbon, and firing the shape.

As described before, in the prior art, silicon carbide particles containing boron uniformly dispersed in the particles have not been obtained in high temperature gaseous synthesis. The silicon carbide particles produced by a process in the prior art do not contain boron in the particles in practice, or only a portion thereof can contain boron in the particles. In contrast, according to the present invention, silicon carbide particles containing boron uniformly dispersed throughout the particles are obtained. This feature of the invention enables a dense silicon carbide sinter to be obtained without the addition of a densifying agent such as free carbon.

Here, the sintering mechanism of silicon carbide with densifying agents of boron and free carbon is considered. A silicon carbide sinter is polycrystalline. This means that fine silicon carbide crystallites are in contact with each other on their different crystal planes. This contact on different crystal planes means chemical bonding between atoms of the different crystal planes, but this is impossible with silicon carbide in its original nature, since silicon carbide is a covalent bonding and the directions of the bonding hands of silicon and carbon are limited, and angle range within which they can move freely is 6 degrees or less. As the directions of the bonding hands of silicon and carbon at different crystal planes are completely different, and the bonding hands can move only within 6 degrees or less, it is almost impossible for the bonding hands of the different crystal planes to bond together. Thus, chemical bonds between different crystal planes of silicon carbide crystallites are extremely difficult to form, and it is therefore practically impossible to produce a sinter of pure silicon carbide.

If the bonding hands are made to be able to move in a range of more than 6 degrees, and different crystal planes are made to be chemically bound to each other, the above obstacles are overcome. It is believed that this is the role played by boron. That is, boron is present near grain boundaries in a silicon carbide sinter and makes the directions of bonding hands of silicon and carbon to be free in certain wider angle range, and thus makes it possible to chemically bond different crystal planes to each other. To achieve this, boron should be contained in the silicon carbide crystal grains. It is believed that this is assisted by free carbon. It is generally said that the role of free carbon is supposedly to remove the surface oxygen of silicon carbide particles, and as a result, boron is easily ingested by silicon carbide particles.

In short, it is considered that free carbon plays a role of impregnating silicon carbide with boron, and boron makes chemical bonding between different crystal planes of silicon carbide possible. If this is so, it can be understood that, according to the present invention, silicon carbide is sintered until a sinter becomes dense even in the absence of free carbon, if silicon carbide particles containing boron in the particles are used.

Oxygen does not always affect a densification of silicon carbide, even if surface oxygen, etc., is present, if boron can be ingested by the silicon carbide particles or if boron is preliminarily contained in the silicon carbide particles. In general, the high temperature characteristics of a silicon carbide sinter are deteriorated by the presence of oxygen in the sinter and therefore, preferably the amount of oxygen in the silicon carbide particles is reduced.

Preferably, the free carbon should be omitted if free carbon is not necessary to make a dense sinter of silicon carbide. Further, sintering silicon carbide without free carbon is a superior process to the sintering of silicon carbide with free carbon, since it is very difficult to ensure that the amount of added free carbon is suitable, in microscale. Free carbon is consumed by surface oxygen, etc., but it is doubtful that free carbon in an amount necessary and sufficient for removing surface oxygen, etc., can be added correctly in microscale. In microscale, it is rather considered that free carbon is present in excess in some locations and is insufficient in other locations. Such excess free carbon acts in a manner extremely similar to permanent micro pores and, therefore, is extremely detrimental. Thus, sintering silicon carbide without free carbon, as in the present invention, not only achieves a simple process for obtaining a dense silicon carbide sinter but also provides preferred characteristics of a sinter.

As described above, it is preferred that free carbon be omitted if free carbon is not necessary for obtaining a dense sinter. In the prior art, it is however considerably difficult to control a process for synthesizing silicon carbide in a high temperature gaseous phase in such a manner that free carbon is completely absent. However, a process for synthesizing silicon carbide according to the present invention allows the process to be controlled in such a manner that the produced silicon carbide particles contain no free carbon. By the infrared absorptiometric method after combustion and hydrogen hot extraction technique, no free carbon was detected in silicon carbide particles obtained by a process as mentioned above according to the present invention.

Silicon carbide particles containing boron uniformly dispersed in the particles but containing substantially no free carbon, can be obtained by a two step process comprising first forming silicon particles containing boron but no carbon compound in a first reaction zone, and then reacting the particles with a carbon compound to form silicon carbide particles containing boron but substantially no free carbon in a second reaction zone. The first step can be attained by using a silicon source and a boron source which do not contain a carbon source. The second step is controlled by monitoring an unsaturated hydrocarbon by-product so that the produced silicon carbide particles contain substantially no fee carbon. The content of boron in silicon carbide particles is preferably 5.0% by weight or less based on the silicon carbide particles. More than 5.0% by weight of boron will disturb the sintering of silicon carbide.

The thus obtained silicon carbide particles containing boron dispersed throughout the particles, but containing substantially no free carbon, can be formed into a shape and fired without the addition of a densifying agent such as free carbon, to give a dense silicon carbide sinter. Shaping can be carried out in any conventional manner. Firing can be achieved, for example, by heating the shaped or compacted silicon carbide particles in an atmosphere inert to silicon carbide at a temperature of 1900° C. to 2200° C. The pressure of the atmosphere may be either above atmospheric pressure or at atmospheric or a reduced pressure. Further, the firing may be conducted by hot pressing. Since a sinter may become denser under pressure, this process is preferable. The density of a silicon carbide sinter should be 90% or more of the theoretical density for practical applications. The present invention provides a silicon carbide sinter having a density of from 98% to more than 99%.

Figure 2:
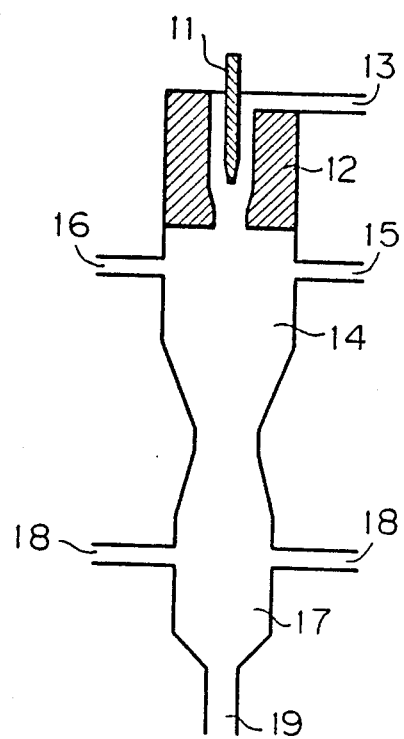
FIG. 2 is a sectional side view of an apparatus of producing silicon carbide particles in two reaction zones according to the present invention.

FIGS. 1 and 2 illustrate examples of an apparatus for producing silicon carbide particles according to the present invention. In FIG. 1, an electrical discharge is generated between a cathode 1 and an anode 2. A gas is introduced from a gas inlet pipe 3 and excited to form plasma, giving a high temperature higher than the melting point of silicon in a reaction zone 4. Into the thus-heated reaction zone 4, a silicon compound or silicon is introduced from an inlet pipe 5 and a carbon compound from an inlet pipe 6. The silicon compound or silicon and the carbon compound react with each other to form silicon carbide particles, which are recovered from an outlet 7. An exhaust gas emitted from the reaction zone 4 through the outlet 7 is analyzed to detect the presence of an unsaturated hydrocarbon such as acetylene. The data for the detection of an unsaturated hydrocarbon is compared with a predetermined specified value, which corresponds to a desired free carbon content in the silicon carbide particles. According to the results of this comparison, the amount of carbon compound introduced from the inlet pipe 6, for example, is modified if necessary, to give the specified value of the amount of the unsaturated hydrocarbon or the desired free carbon content.

The apparatus shown in FIG. 2 is similar to the apparatus of FIG. 1 except that the apparatus in FIG. 2 comprises two reaction zones 14 and 17. A silicon compound or silicon and, if desired, a boron compound or boron are introduced to a first reaction zone 14 from inlet pipes 15 and 16 to form fused silicon carbide particles, containing boron, if introduced. A carbon compound is introduced from an inlet pipe 18 to a second reaction zone 17 to react with the fused silicon particles, and silicon carbide particles containing, if desired, free carbon, are produced therein. The resultant silicon carbide particles are recovered through an outlet 19. A gas emitted from the second reaction zone 17 through the outlet 19 is also analyzed to control the reaction conditions in the second reaction zone, as described with reference to FIG. 1. In FIG. 2, reference numeral 11 denotes a cathode, 12 an anode, and 13 a gas inlet pipe.

The apparatus for producing silicon carbide particles according to the present invention is not limited to those shown in FIGS. 1 and 2. For example, the method for heating a reaction zone or a first reaction zone may be any of direct current plasma heating, high frequency plasma heating, electric resistance heating, induction heating, micro wave heating, infrared heating, laser heating, etc. The second reaction zone may be eliminated, or sometimes it may be necessary to cool the second reaction zone. The detection of unsaturated hydrocarbon may be conducted by any method which enables the unsaturated hydrocarbon to be analyzed in real time, or in a relatively short time period, for example, from several tens of seconds to several minutes.

Example 1

The apparatus used was the same as that shown in FIG. 1. Argon gas was introduced from a gas inlet pipe 3 at a rate of 20 l/min and an electrical discharge was generated between a cathode 1 and an anode 2 under the conditions of 30 V and 700 A to produce an argon plasma to a reaction zone 4. Silane gas was introduced from an inlet pipe 5 at a rate of 1 l/min and methane gas was introduced from an inlet pipe 6 at a rate of 1 to 13 l/min. The diameter of the reaction zone 4 was 40 mm and the temperature in the reaction zone was about 2000° C. Thus, silicon carbide particles were produced in the reaction zone 4.

The resultant silicon carbide particles were recovered from an outlet 7, and an exhaust gas emitted from the reaction zone 4 through the outlet 7 was analyzed by a quadrupole mass spectrometer and the amount of acetylene produced was measured. The amount of acetylene produced was calculated by comparing the peak intensity of acetylene obtained by a quadrupole mass spectrometry with that of pure methane, with the amount of pure methane set at 100. The amounts of the acetylene and the pure methane were normalized by the amount of argon introduced into the apparatus.

The conditions of synthesizing silicon carbide particles were selected so that the amount of acetylene produced was from 0.25 to 6.00, with a pitch of 0.25, as the above-mentioned peak intensity; the total number being 24. The time period for the synthesis were about 3 hours, respectively. In each case, the amount of methane introduced was controlled so that a constant amount of acetylene was produced and the free carbon content of the resultant silicon carbide particles was always constant.

X-ray diffraction revealed that the resultant particles were β-type silicon carbide. The free carbon content of the silicon carbide particles was analyzed by infrared absorptiometric after combustion and hydrogen hot extraction technique. Further, chemical analysis, etc., was effected on the silicon carbide particles. As a result, it was found that only silicon carbide and free carbon were detected. The analyses were conducted on the particles obtained during the first, intermediate, and final stages, respectively, and the free carbon contents of the particles were the same.

Figure 3:
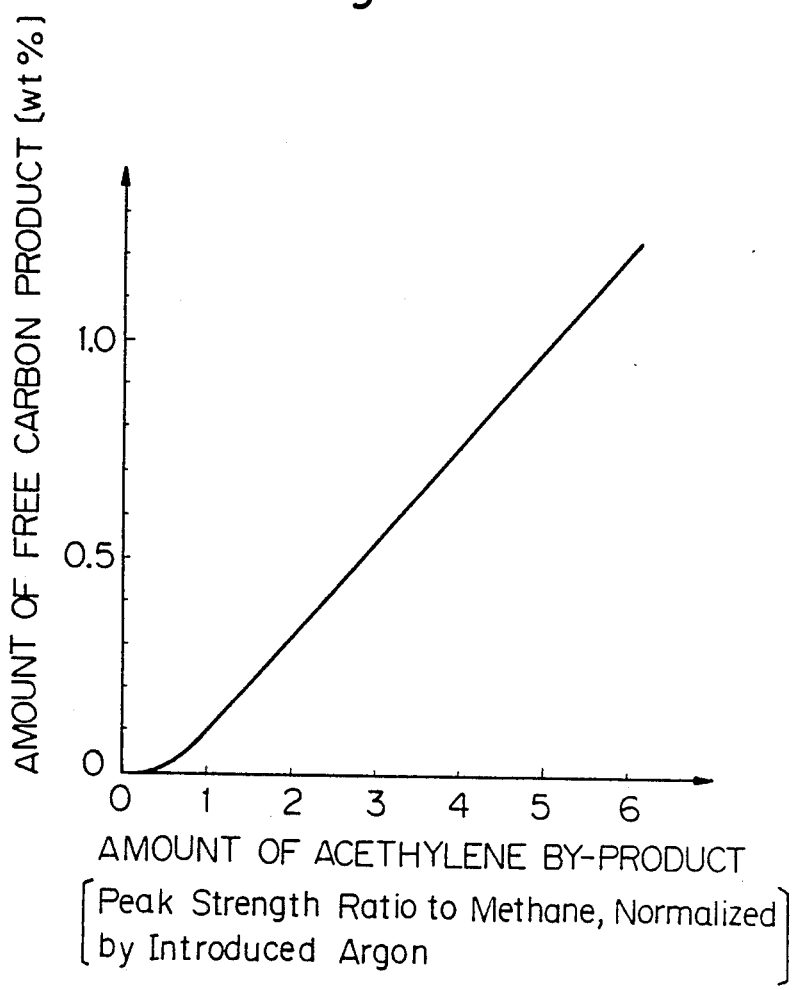
FIG. 3 is a graph of the amount of free carbon content in silicon carbide particles in relation to the amount of acetylene by-product in Example 1.

The resultant relationship between the amount of free carbon product and the amount of acetylene by-product is shown in FIG. 3. From FIG. 3, it can be seen that the relationship between the two is almost constant.

Example 2

The apparatus used was the same as that shown in FIG. 2. Argon gas was introduced from a gas inlet pipe 13 at a rate of 20 l/min and an electrical discharge was generated between a cathode 1 and an anode 2 under conditions of 30 V and 700 A to produce a plasma. Silane was introduced to the first reaction zone 14 from an inlet pipe 15 at a rate of 1 l/min and diborane was introduced therein from an inlet pipe 16 at a rate of 0.015 l/min, with argon gas as the carrier gas. The diameter of the first reaction zone 14 was 70 mm and the temperature was about 2000° C. Fused silicon particles containing boron uniformly therein were produced in the first reaction zone 14.

The fused silicon particles were fed into a second reaction zone 17 and methane was introduced from an inlet pipe 18 to the second reaction zone at a rate of 1 to 1.3 l/min. The fused silicon particles were carbonized in the second reaction zone at a temperature of 1700° to 1800° C., to produce silicon carbide particles containing boron uniformly in the particles.

The resultant silicon carbide particles were recovered from an outlet 17. The exhaust gas emitted from the outlet 17 was analyzed by a quadrupole mass spectrometer.

The synthesis conditions and the methods of analyzing the free carbon content were the same as in Example 1.

The resultant relationship between the amount of free carbon product and the amount of acetylene by-product was the same as in Example 1.

X-ray diffraction revealed that the resultant particles were β-type silicon carbide. By chemical analysis, etc., about 0.8% by weight of boron was detected in addition to silicon carbide and free carbon. X-ray photoelectron spectroscopy revealed the boron was elemental boron.

Example 3

The synthesis of silicon carbide particles in this Example is similar to that of Example 2. However, the diameter of the first reaction zone was 60 mm and the temperature in the first reaction zone was about 2500° C. Methane was introduced to the second reaction zone at a temperature of about 2000° C. and a rate of about 1.1 l/min. The rate of methane introduction was controlled by monitoring the amount of acetylene by-product so that the resultant silicon carbide particles contained 0.6% by the weight of free carbon.

The resultant particles extracted from the outlet had a grain size in a range of 0.1 to 0.7 μm and an average specific surface area of 9.6 m$^2$/g, from observation by a transmission type electron microscope. X-ray diffraction showed that the particles were β-type silicon carbide. By chemical analysis, etc., 0.8% by weight of boron and 0.6% by weight of free carbon were detected. Observation by X-ray photoelectron spectroscopy showed that the boron was elemental boron.

The resultant silicon carbide particles were then subjected to sintering. 100 g of the silicon carbide particles were added and mixed with 5 g of oleic acid solved in acetone. The mixture was dried to evaporate acetone only. The resultant particles were subject to uniaxial forming in a metal die having a size of 5 cm at a pressure of 90 kgf/cm$^2$. The resultant shape was dried at 250° C. to evaporate oleic acid. The shape then had a density of 2.05 g/cm$^2$ (by the Archimedean method), corresponding to 64% of the theoretical density. The shape was sintered in a 1 atom argon atmosphere at 2160° C. for 2 hours. The temperature raising time from room temperature to 2160° C. was about 2 hours and 30 minutes, and the sinter was allowed to cool to the room temperature after the above sintering at 2160° C.

The resultant sinter had a density of 3.16 g/cm$^3$, which corresponds to 98.4% of the theoretical density. The flexural strengths measured according to the method of JIS R 1601 were 68 kgf/mm$^2$ at room temperature and 77 kgf/mm$^2$ at 1500° C.

For comparison, commercial β-type silicon carbide particles were added with boron and carbon black and sintered under the same conditions and procedures as the above. As a result, the silicon carbide sinter had flexural strengths of 55 kgf/mm$^2$ at room temperature and 66 kgf/mm$^2$ at 1500° C. As can be seen, superior results were obtained by using silicon carbide particles produced by a process according to the present invention. It is believed that this is because the particles obtained by the present invention contain boron as a densifying agent extremely uniformly in all particles.

Example 4

The synthesis of silicon carbide particles in Example 3 was repeated except that silane and diborane were preliminarily mixed in a ratio of 1:0.015, followed by introducing the mixture through the inlet pipes into the first reaction zone. The characteristics of the resultant silicon carbide particles containing boron in the particles were similar to those in Example 3.

Further, the sintering in Example 3 was repeated for the resultant silicon carbide particles. The resultant silicon carbide sinter had a density of 3.17 g/cm$^3$ (by the Archimedean method), which corresponds to 98.8% of the theoretical density. The flexural strength of the sinter were 71 kgf/mm$^2$ at room temperature and 81 kgf/mm$^2$ at 1500° C.

Example 5

The synthesis of silicon carbide particles in Example 2 was repeated except that methane was introduced to the second reaction zone at a rate of about 1 l/min and the rate of methane introduction was controlled so that no free carbon was produced, in accordance with the amount of the acetylene by-product which was monitored. Further, the concentration of oxygen in the first and second reaction zones was kept below 0.1 ppm.

X-ray diffraction revealed that the particles were β-type silicon carbide by chemical analysis, only silicon carbide and boron were detected and the boron content was 0.8% by weight of the particles. According to X ray photoelectron spectroscopy the boron was elemental boron. Free carbon was not detected by the infrared absorptiometric method after combustion or hydrogen hot extraction technique, and the absence of free carbon was thus confirmed.

The resultant silicon carbide particles were then subject to sintering. 20 g of silicon carbide particlles produced as above were transferred into a glovebox filled with argon gas and containing 0.01 ppm or less of oxygen, while the particles were prevented from coming into contact with air. In the glovebox, the particles were uniaxially formed at 90 kgf/cm$^2$ to make pellets and the pellets were charged in a rubber bag. The rubber bag with the pellets was discharged from the glovebox and the pellets as charged in the rubber bag were statically pressed under a pressure of 7000 kgf/cm$^2$ to form a shape. The shape was fired in a 1 atm argon atmosphere at 2080° C. for 2 hours. The temperature raising time from room temperature to 2080° C. was about 2 hours and 30 minutes. The sinter was allowed to cool to room temperature after firing at 2080° C.

The resultant silicon carbide sinter had a density of 3.18 g/cm³ (by the Archimedean method), which corresponds to 99.1% of the theoretical density.

Example 6

Example 5 was repeated except that shaping was conducted in air without using a glovebox.

The resultant silicon carbide sinter had a density of 3.16 g/cm³ (by the Archimedean method), which corresponds to 98.4% of the theoretical density.

Example 7

A silicon carbide sinter was produced by the same procedures as in Example 5 except that oleic acid was used as a binder for the shaping. Before uniaxial forming, the silicon carbide particles were added and mixed with 1 g of oleic acid solved in toluene and the mixture was dried to evaporate the acetone only. The oleic acid was evaporated after uniaxial forming and static pressing was conducted. During the above procedure, a glovebox was used and the silicon carbide was prevented from coming into contact with air.

The thus-obtained silicon carbide sinter had a density of 3.18 g/cm³ (by the Archimedean method), which corresponds to 99.1% of the theoretical density.

Example 8

Example 7 was repeated except that the shaping was conducted in air without using a glovebox.

The resultant silicon carbide sinter had a density of 3.16 g/cm³ (by the Archimedean method), which corresponds to 98.4% of the theoretical density.

We claim:

1. A process for producing a silicon carbide powder by reacting a gaseous silicon compound or particulate silicon with a gaseous carbon compound, in which acetylene of a by-product of said reaction is monitored so as to detect in real time a free carbon content in the silicon carbide powder produced, and said reaction is controlled such that the amount of the acetylene by-product is an adequate value, whereby the free carbon content in the silicon carbide powder is controlled to a desired value.

2. A process according to claim 1, wherein the free carbon content in the silicon carbide powder is controlled to substantially no carbon.

3. A process according to claim 1, wherein said carbon compound is an aliphatic hydrocarbon containing 4 or less carbon atoms.

4. A process according to claim 1, wherein said silicon compound is a member selected from the group consisting of silane ($SiH_4$), monchlorosilane ($SiH_3Cl$), dichlorosilane ($SiH_2Cl_2$), trichlorosilane ($SiHCl_3$), silicon tetrachloride ($SiCl_4$), and disilane ($Si_2H_6$).

* * * * *